United States Patent
Rodgers et al.

(10) Patent No.: US 11,868,523 B2
(45) Date of Patent: Jan. 9, 2024

(54) EYE GAZE CLASSIFICATION

(71) Applicant: GOOGLE LLC, Mountain View, CA (US)

(72) Inventors: Ivana Tosic Rodgers, Redwood City, CA (US); Sean Ryan Francesco Fanello, San Francisco, CA (US); Sofien Bouaziz, Los Gatos, CA (US); Rohit Kumar Pandey, Mountain View, CA (US); Eric Aboussouan, Campbell, CA (US); Adarsh Prakash Murthy Kowdle, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 139 days.

(21) Appl. No.: 17/305,219

(22) Filed: Jul. 1, 2021

(65) Prior Publication Data
US 2023/0004216 A1 Jan. 5, 2023

(51) Int. Cl.
*G06F 3/01* (2006.01)
*G02B 27/00* (2006.01)
(Continued)

(52) U.S. Cl.
CPC .......... *G06F 3/013* (2013.01); *G02B 27/0093* (2013.01); *G02B 27/0101* (2013.01);
(Continued)

(58) Field of Classification Search
USPC ....................................................... 345/156
See application file for complete search history.

(56) References Cited

U.S. PATENT DOCUMENTS

| 9,898,082 | B1 * | 2/2018 | Greenwald | ............. G06F 3/013 |
| 2003/0007687 | A1 * | 1/2003 | Nesterov | ............. G06V 40/193 |
|  |  |  |  | 382/167 |

(Continued)

FOREIGN PATENT DOCUMENTS

WO 2019154511 A1 8/2019

OTHER PUBLICATIONS

Koh, "Input evaluation of an eye-gaze guided interface: Kalman filter vs. velocity threshold eye movement identification", Proceedings of the 1st ACM SIGCHI symposium on Engineering Interactive Computing System, EICS 2009 (https://www.researchgate.net/publication/220728596), Jul. 2009, 7 pages.

(Continued)

*Primary Examiner* — Chineyere D Wills-Burns
(74) *Attorney, Agent, or Firm* — Brake Hughes Bellermann LLP

(57) ABSTRACT

Techniques of tracking a user's gaze includes identifying a region of a display at which a gaze of a user is directed, the region including a plurality of pixels. By determining a region rather than a point, when the regions correspond to elements of a user interface, the improved technique enables a system to activate the element to which a determined region is selected. In some implementations, the system makes the determination using a classification engine including a convolutional neural network; such an engine takes as input images of the user's eye and outputs a list of probabilities that the gaze is directed to each of the regions.

21 Claims, 9 Drawing Sheets

(51) Int. Cl.
*G02B 27/01* (2006.01)
*G06F 18/23* (2023.01)
*G06V 20/20* (2022.01)
*G06V 40/18* (2022.01)
*G06N 3/08* (2023.01)

(52) U.S. Cl.
CPC ......... *G02B 27/0172* (2013.01); *G06F 18/23* (2023.01); *G06N 3/08* (2013.01); *G02B 2027/0138* (2013.01); *G02B 2027/0178* (2013.01)

(56) References Cited

U.S. PATENT DOCUMENTS

| | | | | |
|---|---|---|---|---|
| 2012/0106793 | A1* | 5/2012 | Gershenson | G06V 40/20 382/103 |
| 2014/0096077 | A1* | 4/2014 | Jacob | G06F 3/013 715/810 |
| 2016/0025971 | A1* | 1/2016 | Crow | A61B 3/113 345/156 |
| 2016/0162020 | A1 | 6/2016 | Lehman et al. | |
| 2017/0061694 | A1* | 3/2017 | Giraldi | G06F 3/16 |
| 2018/0181809 | A1* | 6/2018 | Ranjan | G06V 10/245 |
| 2018/0203505 | A1* | 7/2018 | Trail | G06F 1/163 |
| 2019/0065817 | A1* | 2/2019 | Mesmakhosroshahi | G06V 20/698 |
| 2019/0147288 | A1* | 5/2019 | Gupta | G06F 3/013 715/253 |
| 2019/0221191 | A1* | 7/2019 | Chhipa | G09G 3/002 |
| 2020/0089316 | A1 | 3/2020 | Raskar et al. | |
| 2020/0250872 | A1 | 8/2020 | Kaehler et al. | |
| 2020/0368616 | A1* | 11/2020 | Delamont | H04N 13/239 |
| 2021/0011550 | A1 | 1/2021 | Barkman et al. | |
| 2021/0026446 | A1 | 1/2021 | Liu et al. | |
| 2021/0042520 | A1* | 2/2021 | Molin | G06V 40/18 |
| 2021/0048938 | A1 | 2/2021 | Scott et al. | |
| 2021/0225186 | A1* | 7/2021 | Yang | G06F 3/013 |

OTHER PUBLICATIONS

Miluzzo, et al., "EyePhone: Activating Mobile Phones With Your Eyes", MobiHeld '10: Proceedings of the second ACM SIGCOMM workshop on Networking, systems, and applications on mobile handhelds (https://doi.org/10.1145/1851322.1851328), Aug. 2010, pp. 15-20.

Park, et al., "Towards End-to-end Video-based Eye-Tracking", European Conference on Computer Vision (https://arxiv.org/abs/2007.13120), Jul. 26, 2020, pp. 747-763.

Tonsen, et al., "A High-Level Description and Performance Evaluation of Pupil Invisible", arXiv.org (https://arxiv.org/abs/2009.00508), Sep. 1, 2020, 12 pages.

Wu, et al., "MagicEyes: A Large Scale Eye Gaze Estimation Dataset for Mixed Reality", arXiv.org (https://arxiv.org/abs/2003.08806), Mar. 18, 2020, 20 pages.

International Search Report and Written Opinion for PCT Application No. PCT/US2022/073337, dated Oct. 19, 2022, 20 pages.

George, et al., "Real-Time Eye Gaze Direction Classification Using Convolutional Neural Network", International Conference on Signal Processing and Communications (SPCOM);, Jun. 1, 2016, 5 pages.

Lemley, et al., "Convolutional Neural Network Implementation for Eye-Gaze Estimation on Low-Quality Consumer Imaging Systems", IEEE Transactions on Consumer Electronics, vol. 65, No. 2;, May 2019, pp. 179-187.

Vora, et al., "Driver Gaze Zone Estimation Using Convolutional Neural Networks: A General Framework and Ablative Analysis", IEEE Transactions on Intelligent Vehicles, vol. 3, No. 3;, Sep. 2018, pp. 254-265.

* cited by examiner

EYE GAZE CLASSIFICATION

TECHNICAL FIELD

This description relates to determining a region of a display at which a user's eye gaze is directed.

BACKGROUND

Some augmented reality (AR) systems track eye gaze direction, i.e., a direction at which the eyes of a user are oriented. For example, an AR system may include smartglasses for displaying content to the user on a transparent display. Some smartglasses include a camera on the glasses frame that is configured to produce images of a user's eyes for tracking an eye gaze direction.

Such an AR system may track eye gaze direction to enable a user interface on the transparent display. For example, there may be first content and second content rendered on the transparent display. The AR system may deduce whether the user is looking at the first content or the second content by determining the eye gaze direction of the user.

SUMMARY

Implementations disclosed herein provide an improved technique for tracking a user's gaze with respect to a display. In some implementations, the display is a transparent display such as that embedded in smartglasses used in an AR system. In some implementations, the display is that used in a mobile computing system, e.g., smartphone, tablet computer, or the like. Rather than track the user's gaze to a particular point on the display, however, the improved technique involves determining at which region of the display the user's gaze is directed. By determining a region rather than a point, when the regions correspond to elements of a user interface, the improved technique enables a system to activate the element to which a determined region is selected. In some implementations, the system makes the determination using a classification engine including a convolutional neural network; such an engine takes as input images of the user's eye and outputs a list of probabilities that the gaze is directed to each of the regions.

In one general aspect, a method can include receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface. The method can also include identifying, based on the image data, a region of the plurality of regions of the display at which a gaze of a user is directed at the instant of time, the identifying including inputting the at least one image of the eye of the user into a classification engine configured to classify the gaze as being directed to one of the plurality of regions. The method can further include activating the element of the user interface to which the identified region corresponds.

In another general aspect, a computer program product comprises a non-transitory storage medium, the computer program product including code that, when executed by processing circuitry of a computing device, causes the processing circuitry to perform a method. The method can include receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface. The method can also include identifying, based on the image data, a region of the plurality of regions of the display at which a gaze of a user is directed at the instant of time, the identifying including inputting the at least one image of the eye of the user into a classification engine configured to classify the gaze as being directed to one of the plurality of regions. The method can further include activating the element of the user interface to which the identified region corresponds.

In another general aspect, an electronic apparatus comprises memory and controlling circuitry coupled to the memory. The controlling circuitry can be configured to receive image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface. The controlling circuitry can also be configured to identify, based on the image data, a region of the plurality of regions of the display at which a gaze of a user is directed at the instant of time, the identifying including inputting the at least one image of the eye of the user into a classification engine configured to classify the gaze as being directed to one of the plurality of regions. The controlling circuitry can further be configured to activate the element of the user interface to which the identified region corresponds.

The details of one or more implementations are set forth in the accompanying drawings and the description below. Other features will be apparent from the description and drawings, and from the claims.

DETAILED DESCRIPTION

Conventional eye gaze direction trackers are configured to estimate a pixel of the transparent display at which the eye of the user is most likely to be looking. For example, a conventional eye gaze direction tracker may derive a pixel-based heatmap for the transparent display, with each pixel having a color based on a probability that the user is looking at that pixel.

Because the output of the conventional eye gaze direction trackers is directed to an identification of a pixel of the transparent display, a technical problem with the above-described conventional approaches to tracking a user's gaze is that the conventional eye gaze direction trackers can be resource-intensive and error-prone. For example, while a conventional eye gaze direction tracker may identify a pixel at which a user is most likely looking, such a pixel may not be identified with any content rendered on the transparent display. Accordingly, a system employing such an eye gaze direction tracker may also need to map that pixel to displayed content; such a mapping may consume computing resources needed for other tasks and may interfere with the user's experience.

In accordance with the implementations described herein, a technical solution to the above-described technical problem includes identifying a region of a display at which a gaze of a user is directed, the region including a plurality of pixels. By determining a region rather than a point, when the regions correspond to elements of a user interface, the improved technique enables a system to activate the element to which a determined region is selected. In some implementations, the system makes the determination using a classification engine including a convolutional neural network; such an engine takes as input images of the user's eye and outputs a list of probabilities that the gaze is directed to each of the regions.

A technical advantage of disclosed implementations is that such implementations use fewer computing resources and is less error prone. For example, in some implementations a region may be associated with a user interface element, e.g., a window containing content rendered on the display; such an association uses less computing resources to activate the window on the display than mapping an identified pixel to such a window as done in the conventional eye gaze direction trackers.

It is noted that, in contrast to the above-described conventional approaches, the output of the improved techniques is a vector of likelihoods corresponding to regions rather than individual pixels. The output is accordingly of much smaller size than that of the conventional approaches.

Figure 1A:
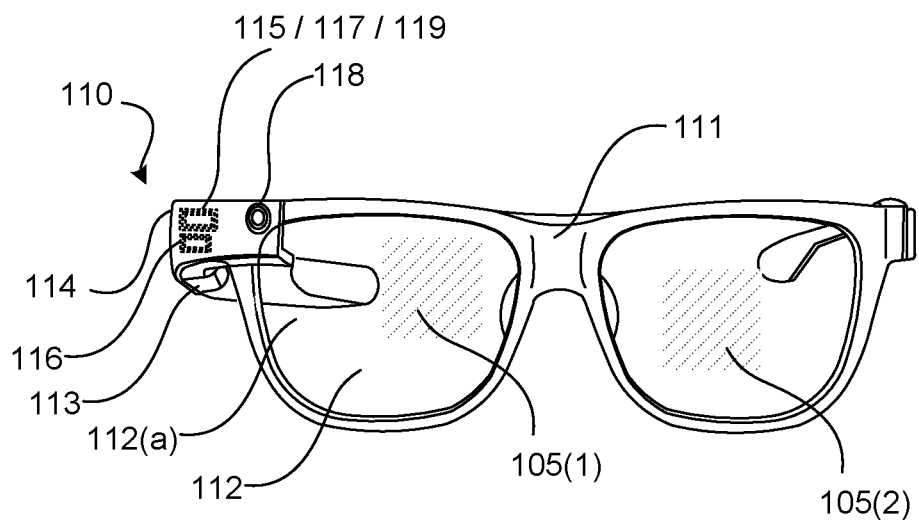
FIG. 1A is a diagram that illustrates example smartglasses used in an augmented reality (AR) system.

FIG. 1A is a diagram that illustrates example smartglasses 110 used in an augmented reality (AR) system as a head. FIG. 1A shows a world side 112(a) of a transparent display 112 of the smartglasses 110. The smartglasses 110 may be used as a head-mounted display (HMD) within an AR system. The smartglasses 110 include a frame 111, with a transparent display 112 coupled in the frame 111. In some implementations, an audio output device 113 is coupled to the frame 111. In some implementations, a touch surface 114 allows for user control, input and the like of the smartglasses 110. The smartglasses 110 may include a sensing system 116 including various sensing system devices and a control system 117 including various control system devices to facilitate operation of the smartglasses 110. The control system 117 may include a processor 119 operably coupled to the components of the control system 117 and a communication module 115 providing for communication with external devices and/or networks. The smartglasses 110 may also include an image sensor 118 (i.e., a camera 118), a depth sensor, a light sensor, and other such sensing devices. In some implementations, the image sensor 118, or camera 118 is capable of capturing still and/or moving images, patterns, features, light and the like.

It is noted that, in some implementations, the smartglasses 110 may be replaced with any sort of HMD that includes a transparent display, in which the form of the HMD is not necessarily wearable glasses or goggles. For example, one such HMD may take the form of a camera with a viewfinder configured to display AR content and allow viewing of the world-side environment.

Figure 1B:
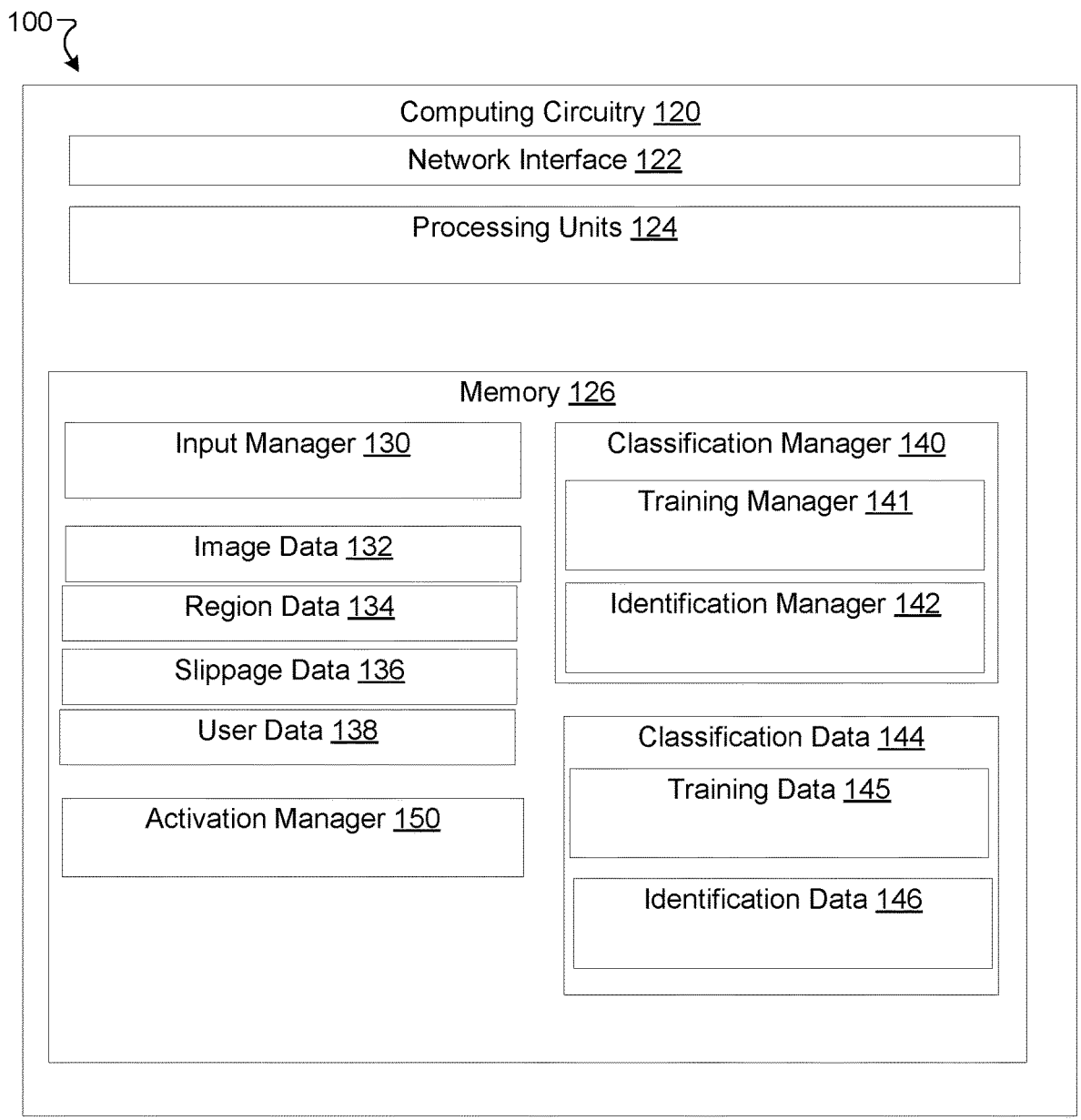
FIG. 1B is a diagram that illustrates an example electronic environment in which improved techniques described herein may be implemented.

FIG. 1B is a diagram that illustrates an example electronic environment 100 in which the above-described technical solution may be implemented. The computer 120 is configured to determine a region of a display at which a user's gaze is directed.

The computer 120 includes a network interface 122, one or more processing units 124, and memory 126. The network interface 122 includes, for example, Ethernet adaptors and the like, for converting electronic and/or optical signals received from the network 150 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include an input manager 130, a classification manager 140, and an activation manager. Further, as illustrated in FIG. 1, the memory 126 is configured to store various data, which is described with respect to the respective managers that use such data.

The input manager 130 is configured to receive input data such as image data 132, region data 134, slippage data 136, and user data 138. In some implementations, the various input data are captured via hardware connected to a display, e.g., transparent display 112 (FIG. 1A). For example, the hardware may include a camera, e.g., camera 118, configured to capture images of a user's eye. In some implementations, the hardware includes any of a gyroscope, a magnetometer, a GPS receiver, and the like to acquire input data such as the slippage data 136 and user data 138. In some implementations, the input manager 130 is configured to receive the input data over the network interface 122.

The image data 132 represents at least one image of a user's eye. The image data 132 is arranged for input into the classification manager 140. In some implementations, the image data 132 represents a sequence of images of the user's eye for tracking a gaze direction. In some implementations, the sequence of images are frames of a video that tracks the motion of the user's eye.

The region data 134 represents the regions of the display. Each of the regions includes a plurality of pixels of the display. In some implementations, each region corresponds with a respective element of a user interface, e.g., a window containing content to be viewed by the user. In some implementations, each region has a rectangular shape that includes an array of pixels. In some implementations, at least one region is non-contiguous and includes multiple rectangles. In some implementations, the region data 134 includes identifiers that identify each region.

The slippage data 136 represents, for implementations in which the display is a transparent display used in smartglasses, parameter values corresponding to a degree of slippage of the smartglasses from a nominal location on a user's face. In a nominal configuration of a gaze tracking system, the eye is at a nominal location with a known (designed) pose relative to the display. During wearing, the position of the glasses can change from this nominal location (slipping on the nose, adjustment by the user, etc.). When slippage occurs, the pose between the eye and the eye tracking camera changes and the images of the user's eye appear different from the case of the nominal configuration. Moreover, the gaze angle will be different because the position of the display changes with the slippage of smartglasses. Accordingly, in some implementations, the slippage data 136 includes, as a parameter value, an estimate of the eye position relative to the camera. In some implementations, such a relative eye position is expressed as a three-dimensional vector. In some implementations, such a relative eye position is expressed as an angular coordinate on a sphere.

The user data 138 represents parameter values describing physical differences between users that may affect the determination of the region at which the user's gaze is directed. For example, user differences in eye appearance, visual axis, head shape, etc. can all affect the accuracy of the determination. Accordingly, in some implementations, the user data 138 represents value of parameters that define eye appearance, visual axis, and head shape. In some implementations, such parameter values are deduced directly from the image data 134.

The classification manager 140 is configured to determine the region of the display at which the user's gaze is directed and thereby produce classification data 144 based on at least the image data 132. In some implementations, the classification data 144 is based on any of the region data 134, the slippage data 136, and the user data 138. The classification manager 140, in some implementations, includes at least one branch of a convolutional neural network (CNN) that acts as a classification engine. The classification manager 140 includes a training manager 141 and an identification manager 144. The classification data 144 includes training data 145 and identification data 146.

In some implementations, the CNN takes as input the image data 132. In some implementations, the CNN also takes as input any of the region data 134, the slippage data 136, and the user data 138. In some implementations, the CNN has a specified number of layers, one of which is an output layer producing an output. Such a neural network is configured to produce a classification result: which region of the display is the region at which the user's gaze is directed. In some implementations, the output includes a vector of values indicative of a likelihood that the user's gaze is directed to each region.

The training manager 141 is configured to generate the classification engine, i.e., a neural network, based on the training data 145. For example, in some implementations the training data 145 represents images of the user's eye along with corresponding identifiers of regions at which the user's gaze was directed when that image was taken. The training manager 141 then adjusts weights of nodes within hidden layers of the neural network to optimize a specified loss function. In some implementations, a loss function includes a categorical cross entropy appropriate for multi-class classification engines such as the CNN described above. In some implementations, a loss function includes a Kullback-Leibler divergence loss. In some implementations, the classification engine learns a calibration to different region layouts based on region data 134; further details are shown with regard to FIG. 4. The weights adjusted by the training manager 141 and other data representing an architecture of the neural network are included in the classification data 144.

The identification manager 142 is configured to classify the image data 132 to identify a region of the display at which the user's gaze is directed. As shown in FIG. 1B, the classification data 144 includes identification data 146 output from the identification manager 142. In some implementations, the identification data 146 represents a vector of likelihood values, e.g., probabilities that the user's gaze is directed to each of the regions of the display.

In some implementations, the identification manager 142 is configured to produce the classification data based on a loss function as described above used to train the classification engine. In some implementations, the identification manager 142 is configured to accept as any of input region data 134, slippage data 136, and user data 138. In some implementations, the training data 145 includes region, slippage, and user data coupled with identifiers of regions at which the user's gaze is directed. In some implementations, each of the above type of data is used to generate additional branches of the classification engine; further details are shown with regard to FIG. 4.

In some implementations, each of the regions described in the region data 134 corresponds to an element of a user interface, e.g., a window. The activation manager 150 is configured to activate a user interface element on the display in response to that user interface element corresponding to a region determined to be that at which the user's gaze is directed. For example, when it is determined that a user's gaze is directed to a region of the display corresponding to a window, e.g., the window is contained in the region, the window is the region, etc., the activation manager 150 is configured to activate the window, i.e., make the window active by highlighting its title bar while dimming the title bars of the other windows. In the implementations involving the display being embedded in smartglasses, a user may perform operations on content displayed in the window using, e.g., voice commands. When the user directs their gaze toward another region and the classification manager 140 identifies the other region as the region at which the user's gaze is directed, the activation manager 150 activates the window corresponding to the other region.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1B can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1B, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an input manager 130 (and/or a portion thereof), a classification manager 140 (and/or a portion thereof), and an activation manager 150 (and/or a portion thereof can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1, the memory 126 is configured to store various data, including image training data 131, reference object data 136 and prediction engine data 150.

Figure 2A:
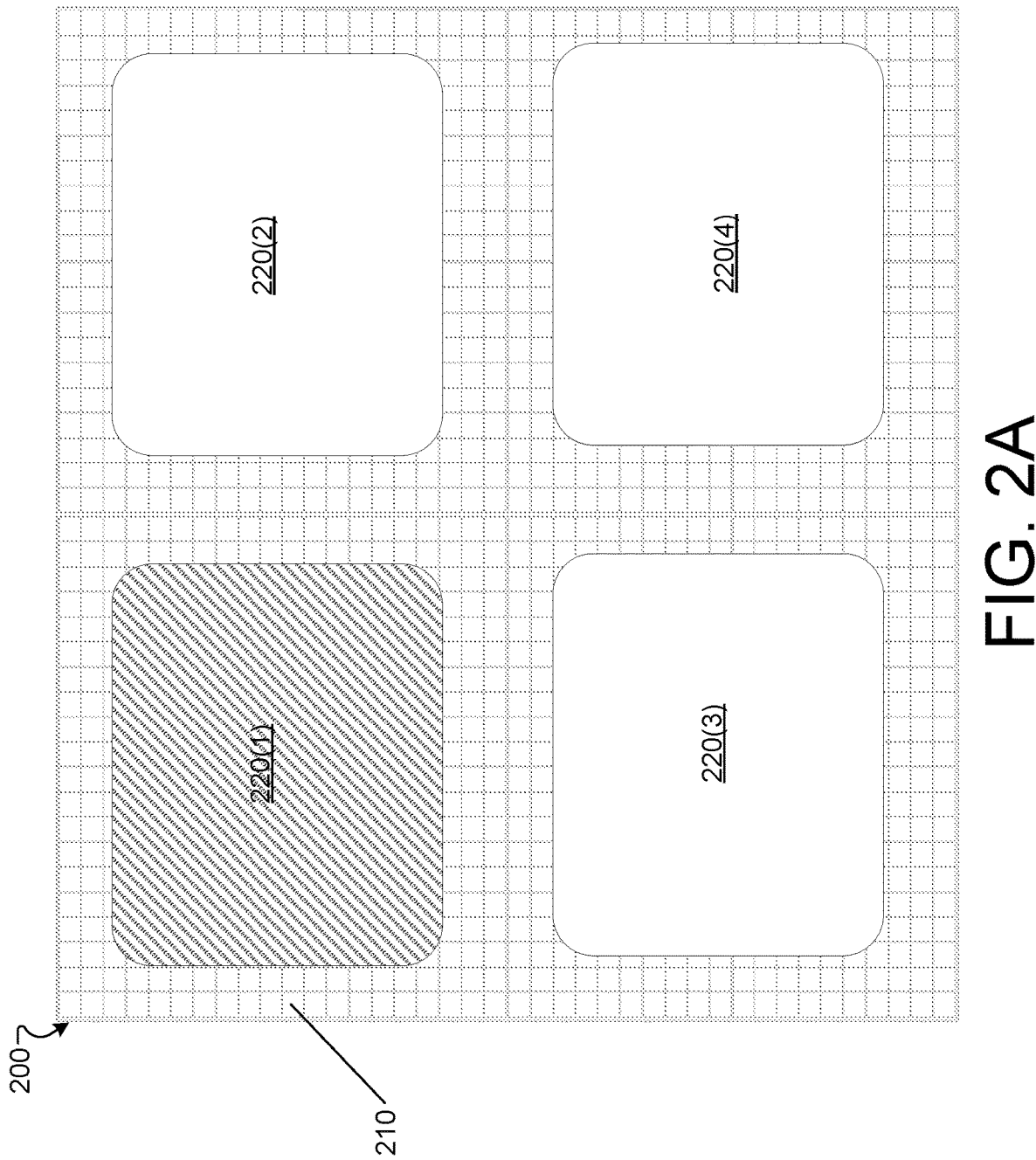
FIG. 2A is a diagram that illustrates example regions on a display, including an activated region.

FIG. 2A is a diagram that illustrates example regions 220(1-4) on a display 200 including an activated region 220(1). In some implementations, the display 200 is a transparent display embedded in smartglasses for an AR application. In some implementations, the display 200 is a display on a portable computing device such as a smartphone or a tablet computer.

The display 200 includes an array of pixels 210; each pixel represents a color or grayscale level that is a building block of displayed content. Each of the regions 220(1-4) includes a respective array of pixels. As shown in FIG. 2A, the regions 210(1-4) have rounded corners but this is by no means a requirement.

The region 220(1) is shown as identified as being the region at which the user's gaze is directed, while the other regions 220(2-4) are not identified as such. This means that it was determined by the identification manager 142 that a user's gaze was directed to the region 220(1). The classification engine 140 is configured to perform the identification of a region in real time so that regions are identified with very little latency when the user changes the direction of their gaze. Accordingly, the arrangement of the regions shown in FIG. 2A implies that the user is currently looking at region 220(1).

Figure 2B:
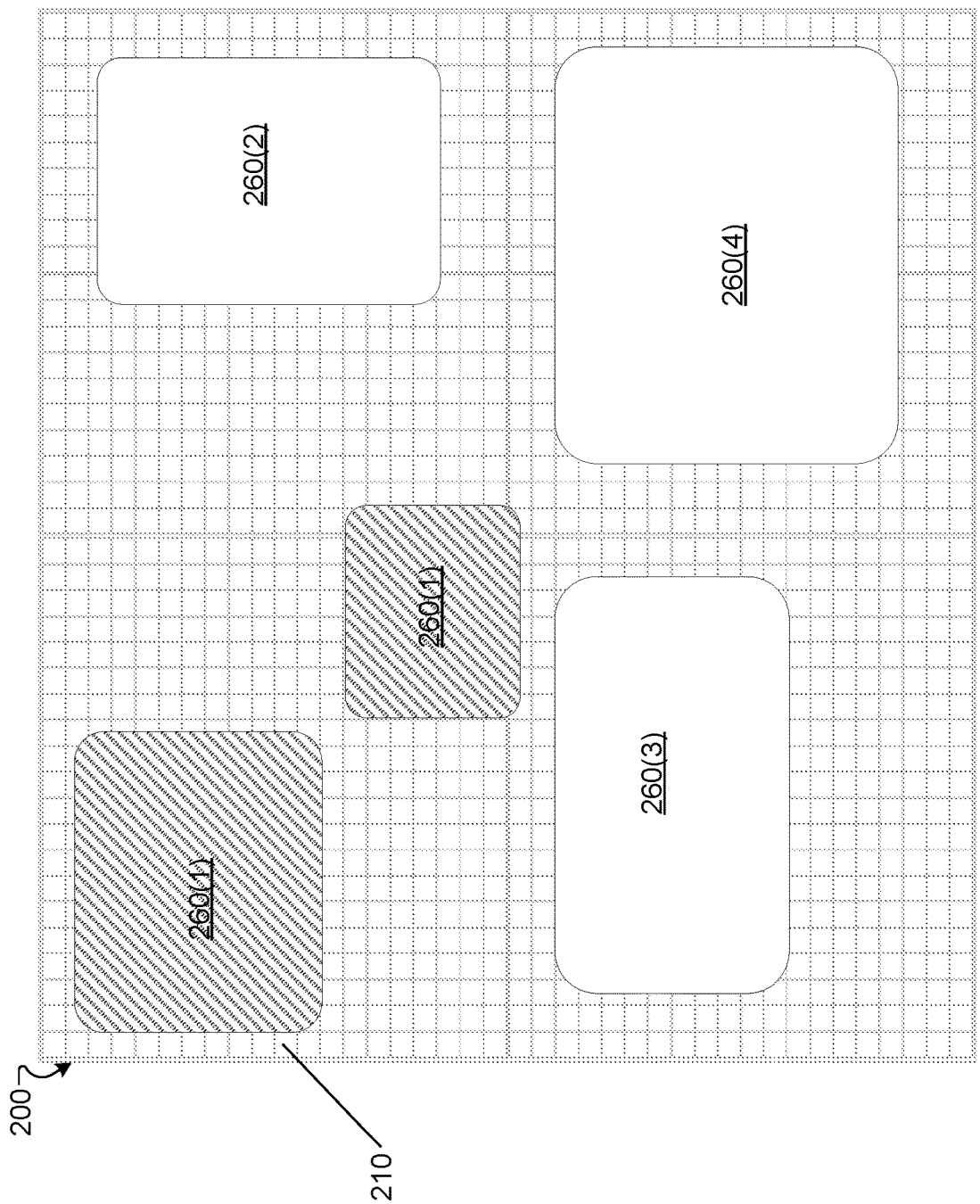
FIG. 2B is a diagram that illustrates example regions on a display, including an activated region; in this case, the regions may not be contiguous.

FIG. 2B is a diagram that illustrates example regions 260(1-4) on a display, including an activated region 260(1); in this case, the regions may not be contiguous. For example, as shown in FIG. 2B, the region 260(1) includes two separate subregions separate from one another. Such a noncontiguous region may occur, for example, when the subregions correspond to different windows in a single application. In some implementations, the region 260(1) may not have a rectangular shape but is contiguous; in such an implementation, the region may be decomposed into several rectangles or defined as a polygon over the grid of pixels 210.

It is noted that the identification manager 142 does not require the eye tracker to provide the exact pixel of the gaze, but only to find the region on which the gaze is directed. In the examples shown in FIGS. 2A and 2B, the camera would need to provide input data if the gaze is on regions 220(1-4). By formulating the problem this way, the accuracy requirements for tracking a user's gaze may be relaxed to only the accuracy needed for the given user interface design. Furthermore, by doing so the computation time, power consumption, memory can be reduced and possibly make the gaze tracking more robust.

Figure 3A:
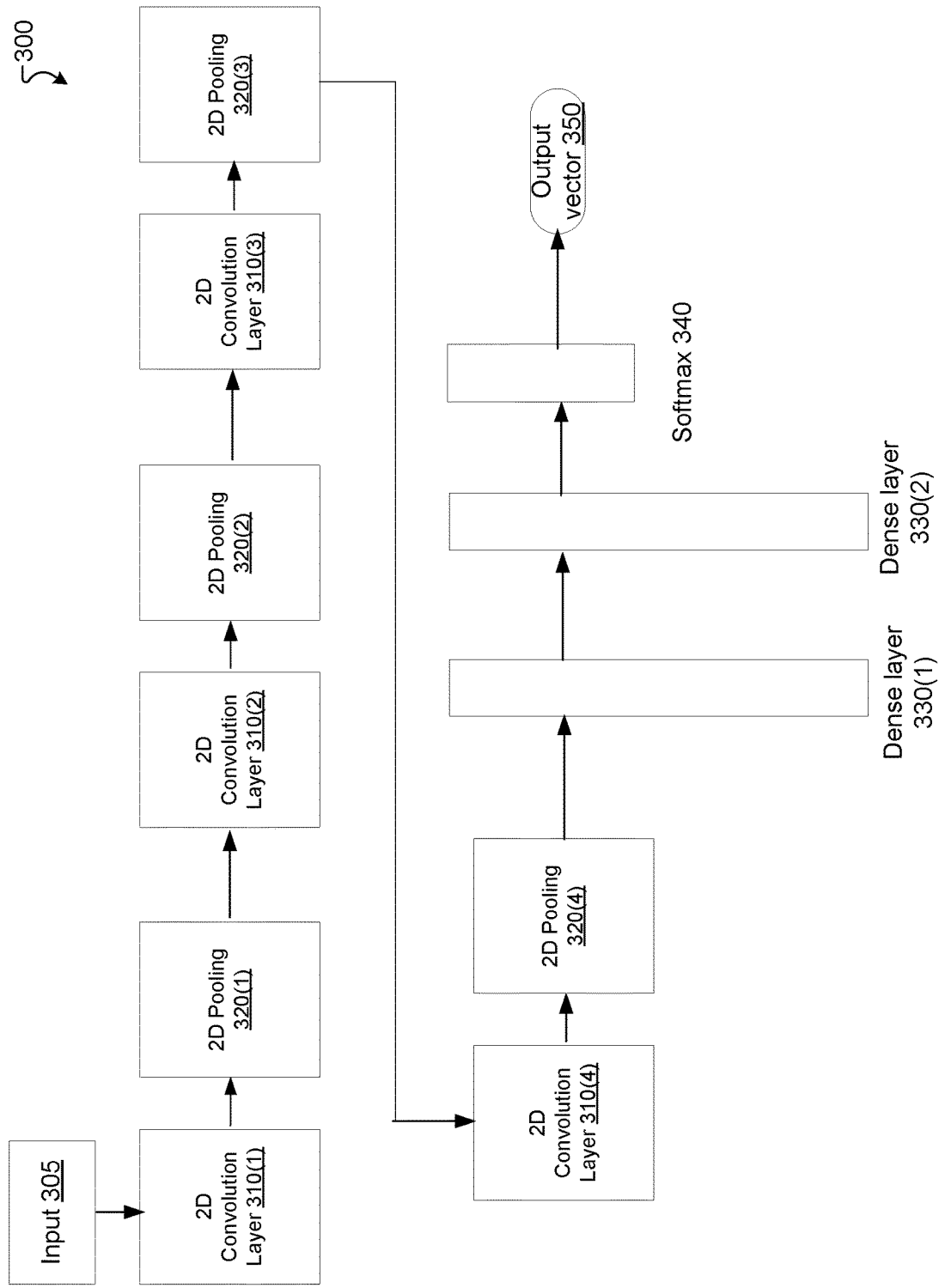
FIG. 3A is a diagram that illustrates an example convolutional neural network (CNN) configured to classify an image of a user's eye as having a gaze directed to a particular region.

FIG. 3A is a diagram that illustrates an example convolutional neural network (CNN) 300 configured to classify an image of a user's eye as having a gaze directed to a particular region. This is a convolutional neural network (CNN) that consists of CNN layers, pooling layers and dense layers. The input is an image obtained from a camera that is mounted on smartglasses frames and that images the user's eye. The output of the network is a vector of length N, where N is the number of regions. The index of the largest value in an output vector 350 gives the identified region of the gaze. Optionally, a softmax layer 340 may be added after the last dense layer, which normalizes each value inside the output vector to be between 0 and 1 and that all values sum up to 1. Each value then represents the probability that the gaze is directed to a particular region. In some implementations, each CNN layer includes an activation function, such as a Rectified Linear Unit, a Sigmoid, or a hyperbolic tangent.

In some implementations in which there are two classes, i.e., regions, with similar probabilities (i.e., probabilities that differ less than a specified threshold difference), the computer 120 may render and display only those two regions. In some implementations, the computer 120 asks the user to manually select a region from the two displayed.

In some implementations, the region data 134 includes an identifier for the space outside of the display, i.e., defines a new region not included in any region or including any pixels. In such an implementation, it may be determined that the user is not looking at the display.

As shown in FIG. 3A, input data 305 is introduced into a 2D convolution layer 310(1), which is followed by a pooling layer 320(1). In the example illustrated in FIG. 3, there are four 2D convolution layers 310(1-4), each followed by a respective pooling layer 320(1-4). Each of the four convolution layers 310(1-4) shown have a kernel size of 3×3, with two strides. The output size from 2D convolution layers 310(1-4) are, respectively, 16, 32, 64, and 128.

Following these convolution layers 310(1-4) and their respective pooling layers 320(1-4) are dense layers 330(1) and 330(2). In some implementations, the dense layers 330(1) and 330(2) are used to merge other branches of the CNN into the branch defined as having the convolution layers 310(1-4) and their respective pooling layers 320(1-4). For example, a second branch of the CNN may be trained to generate output values based on region data 134, slippage data 136, and/or user data 138. The dense layers 330(1) and 330(2), then, may provide adjustments to a classification model defined by the first branch of the CNN based on the arrangement of the regions, any slippage of smartglasses down a user's face, or other user characteristics.

The classification model is generated by the training manager 141 using training data 145. The training data 145 represents training datasets and identifiers for regions at which the gazes represented in the training datasets are directed. The training datasets include images of the user's eye over time. In some implementations, the images are generated on a periodic basis, e.g., every second, every 0.5 seconds, every 0.1 seconds, or so on. These images and the corresponding region identifiers are input to a loss function, and the values of the layer nodes are generated by optimizing the loss function.

In some implementations, the region data 134 is expressed in terms of pixel coordinates or angles. In such implementations, the training manager 141 converts the coordinates or angles into region identifiers. In some implementation, this conversion may be accomplished using a lookup table. In some implementation, this conversion is accomplished by computing the closest tile center according to, e.g., Euclidean distance or a cosine distance between a gaze vector and a vector representing the center of the region.

The loss function includes, in some implementations, a categorical cross entropy appropriate for multi-class classification problems. Such a cross-entropy loss may be represented mathematically as follows:

$$\mathcal{L}_{CE} = -\sum_{i=1}^{C} p_i \log q_i,$$

where C is the number of classes (e.g., the number of regions over the display), $p_i$ is the label for class i and $q_i$ is the output of the network; in some arrangements, the output of a softmax layer. In some implementations, the labels for the classes are in a one-hot representation in which $p_i=1$ only for the class to which an example belongs, and $p_i=0$ otherwise. The above equation represents a loss per example (i.e., image from training data 145); a total loss is obtained by summing the cross-entropy loss over all examples in a batch and dividing by the batch size.

In some implementations, the loss function includes a Kullback-Leibler divergence loss. Such a Kullback-Leibler divergence loss may be represented mathematically as follows:

$$\mathcal{L}_{KL} = \sum_{i=1}^{C} p_i \log\left(\frac{p_i}{q_i}\right),$$

where C is the number of classes (e.g., the number of regions over the display), $p_i$ is the label for class i and $q_i$ is the output of the network; in some arrangements, the output of a softmax layer. The above equation represents a loss per example (i.e., image from training data); a total loss is obtained by summing the Kullback-Leibler divergence loss over all examples in a batch and dividing by the batch size In some implementations, the loss function includes a triplet loss used to optimize a metric space defined by an area encompassing the gaze space, i.e., all the locations that the user can look at; in such a metric space image clusters may be defined. These image clusters in turn define anchor points, and the loss function may be based in part on a distance from the anchor points. Such a triplet loss may be represented mathematically as follows:

$$\mathcal{L}_T = \sum_{k=1}^{K} \max\{\|f(A_k) - f(P_k)\|^2 - \|f(A_k) - f(N_k)\|^2 + \alpha, 0\},$$

where f(x) represents a neural network transform, $A_k$ represents an anchor input (i.e., an image), $P_k$ is a positive example, and $N_k$ is a negative example. The summation is over all possible triplets of (anchor, positive example, negative example). α represents a small number that introduces a margin between positive and negative examples, used in avoiding trivial solutions of all zeroes.

Figure 3B:
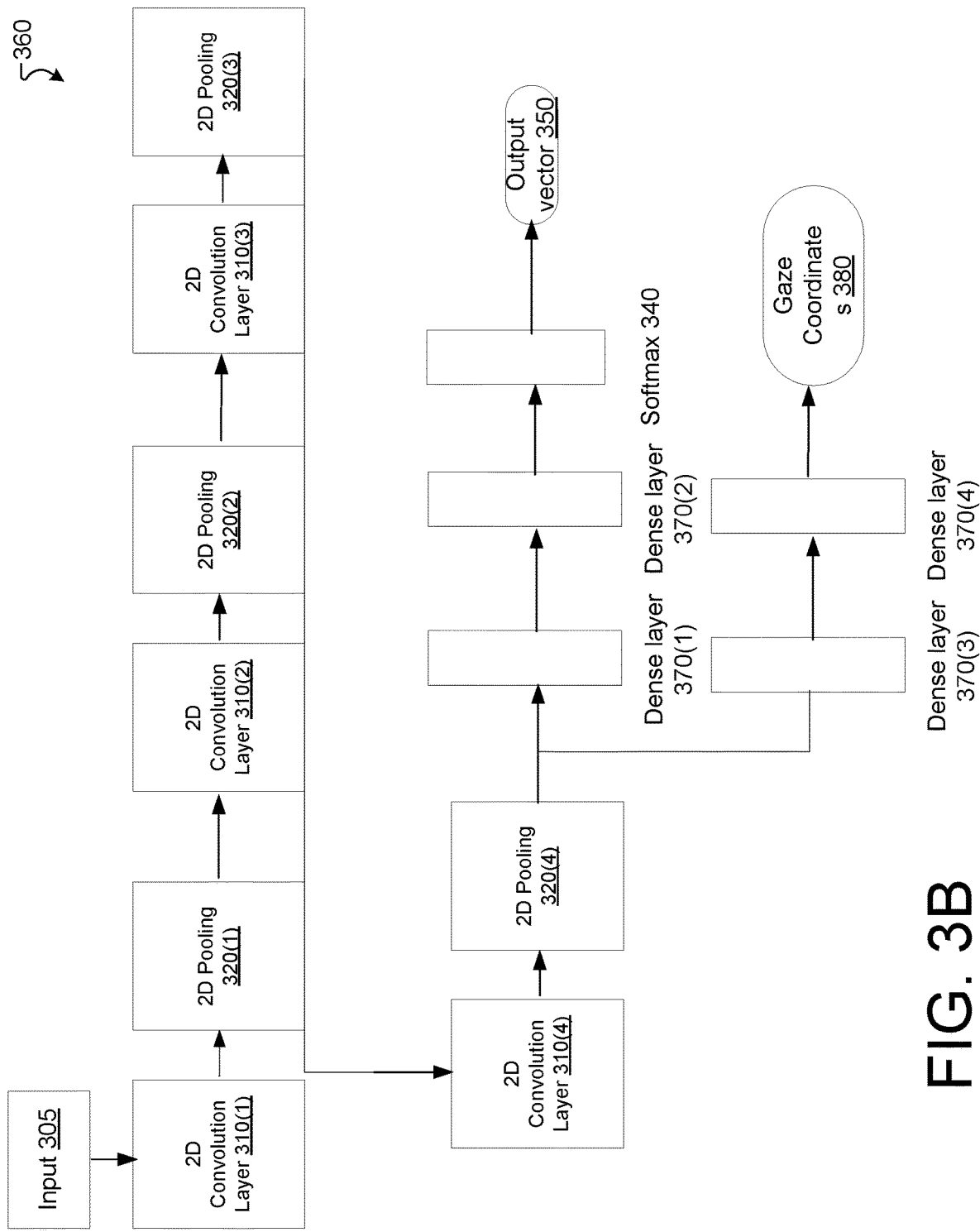
FIG. 3B is a diagram that illustrates an example convolutional neural network (CNN) configured to classify an image of a user's eye and determine a particular point where the gaze is directed.

FIG. 3B is a diagram that illustrates an example convolutional neural network (CNN) 360 configured to classify an image of a user's eye as having a gaze directed to a particular point. The CNN 360 is similar to CNN 300 (FIG. 3A), except that there are new dense layers 370(1-4). Dense layers 370(1,2) are similar to the dense layers 330(1,2) of FIG. 3A. Dense layers 370(3,4), however, are configured to produce coordinates of a most likely point on the display at which the user's gaze is directed.

As stated above, the dense layers 330(1) and 330(2) of FIG. 3A, or 370(1-4) of FIG. 3B, allow for an adjustment to the classification model based on other input data such as region data 134, slippage data 136, and user data 138. An example branch that provides output to a dense layer, e.g., dense layer 330(1) is shown in FIG. 4.

Figure 4:
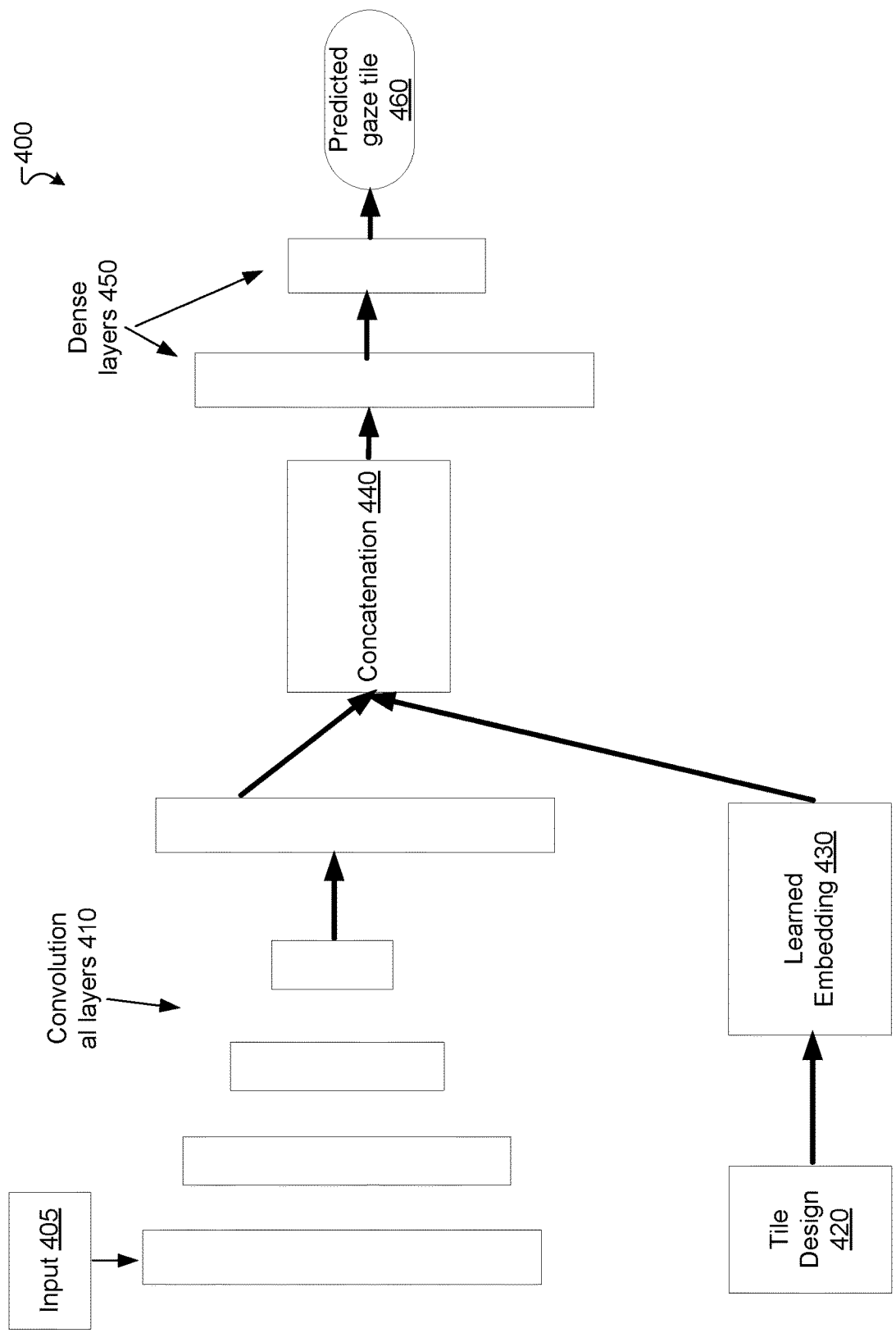
FIG. 4 is a diagram that illustrates example convolutional layers forming another branch of a CNN, in this case configured to adapt for different region or tile geometries.

FIG. 4 is a diagram that illustrates example convolutional layers forming another branch of a CNN 400, in this case configured to adapt for different region or tile geometries. It is noted that similar branches may be defined for the slippage and user adjustments. The output of the other branch is fed into dense layers that adjust the output from that using the image data 132 only.

The CNN 400 takes input 405 into convolution layers 410 of a first branch and provides a first output via a first dense layer to a concatenation layer 440. In a second branch, the CNN inputs a tile design 420, i.e., an arrangement of regions, into a learned embedding layer 430. The output of this learned embedding layer 430 is also input into the concatenation layer 440. The concatenating layer 440 concatenates the output of the first dense layer with the output of the embedding layer 430. The concatenated output is used to determine the region at which the gaze is directed.

There are several alternative approaches to determining the region at which a gaze is directed than that illustrated in FIG. 4. In some implementations, multiple models are trained, each model corresponds to a respective arrangement. In some implementations, training is performed on small regions and the output is binned for each arrangement. In some implementations, a network is trained such that the network has fixed convolutional layers for all arrangements but different dense layers for each arrangement.

Similar approaches may be employed with regard to other input data. For example, with regard to user calibration based on slippage data 136, the eye is at a nominal location with a known (designed) pose relative to the display. During wearing, the position of the glasses can change from this nominal location (slipping on the nose, adjustment by the user, etc.). When slippage happens, the pose between the eye and the eye tracking camera changes and the images of the eyes appear different from the case of the nominal configuration. Moreover, the gaze angle will be different because the position of the display changes with the slippage of glasses. Because of that, the neural network might produce wrong classifications.

In some implementations, one infers a pose (position and orientation) of the eye relative to the camera. To do this, one may take the following approach: Train a network that learns to decouple the gaze classification and estimation of the eye position relative to the camera (or display). The estimation of the eye position relative to the display could use parts of the eye image that do not change with gaze (such as the corners of the eye). Selection of these image parts could be done with an attention neural network model, for example. These image parts could be compared in two sets of images: the first set could be from the calibration phase, and the second set from the images captured during gaze classification runtime.

Other alternatives to adjusting the classification model with the slippage data 136 includes an assumption of a finite set of possible slippage positions and perform a classification of eye positions based on the finite set. User cues may also be used to detect whether slippage has occurred. Finally, one may employ a brute-force approach in which the CNN is trained to be invariant with respect to position changes due to slippage.

With regard to user data 138, the CNN may be calibrated to account for differences in eye appearance, visual axis, head shape, and the like. For example, a calibration scheme involves directing the user to look at specific targets on the display with known region associations. During calibration, eye camera images are recorded and region identifiers of the targets are saved as labels as part of the user data 138. The user data 138 then may be used in the following ways:

To fine tune the existing, pre-trained neural network,
To train additional network branches or structures added specifically for calibration,
To learn an encoder during training that takes as input only the calibration data and predicts a user-specific embedding layer,
To align images such that eye landmarks in the user data 138 are aligned with eye landmarks in the training data 141.

In some implementations, a smooth, stable temporal gaze is desired. In such implementations, temporal filtering may be used to accomplish the smooth, stable temporal gaze, as follows:

compute a mean or median score from softmax layer outputs from consecutive video frames in the image data 132,
incorporate a recursive neural network (RNN) layer configured to take outputs of a convolutional layer and train a RNN cell on top (e.g., long short-term memory cell, GRU cell, or the like),
classify, in some implementations, eye movement as a fixation, a saccade, or a pursuit.

In some implementations, the output of the CNN includes a region identifier as well as an estimated location within the display at which the gaze is directed.

Figure 5:
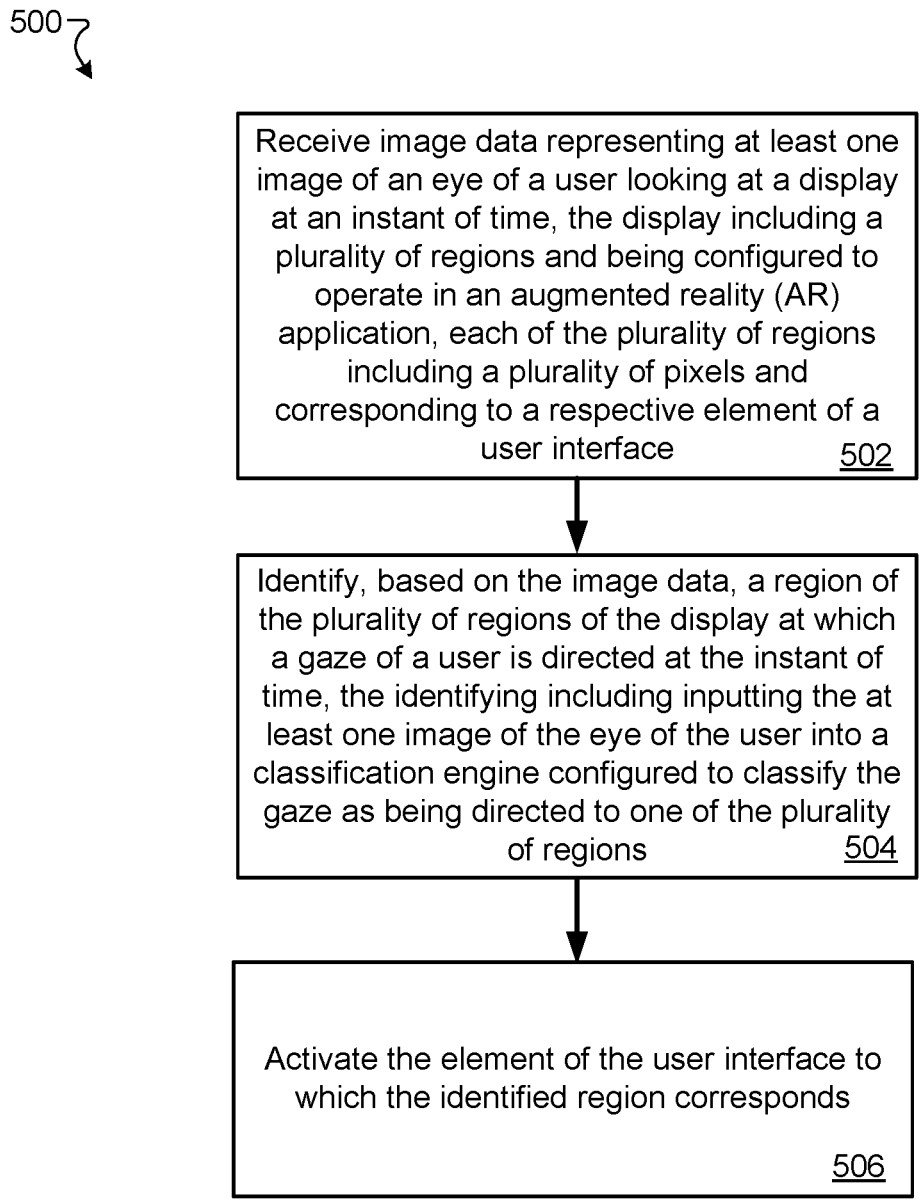
FIG. 5 is a flow chart that illustrates an example method of performing the improved technique within the electronic environment.

FIG. 5 is a flow chart depicting an example method 500 of determining a region at which a user's gaze is directed. The method 500 may be performed by software constructs described in connection with FIG. 1B, which reside in memory 126 of the computing circuitry 120 and are run by the set of processing units 124 or may be performed by software constructs which reside in memory of the computing circuitry 120.

At 502, the computer 120 receives image data (e.g., image data 132) representing at least one image of an eye of a user looking at a display at an instant of time, the display including a plurality of regions (e.g., regions 220(1-4)) and being configured to operate in an augmented reality (AR) application (e.g., in smartglasses 110), each of the plurality of regions including a plurality of pixels (e.g., pixels 210) and corresponding to a respective element of a user interface.

At 504, the computer 120 identifies, based on the image data, a region of the plurality of regions of the display at which a gaze of a user is directed at the instant of time, the identifying including inputting the at least one image of the eye of the user into a classification engine configured to classify the gaze as being directed to one of the plurality of regions.

At 506, the computer 120 activates the element of the user interface to which the identified region corresponds.

Figure 6:
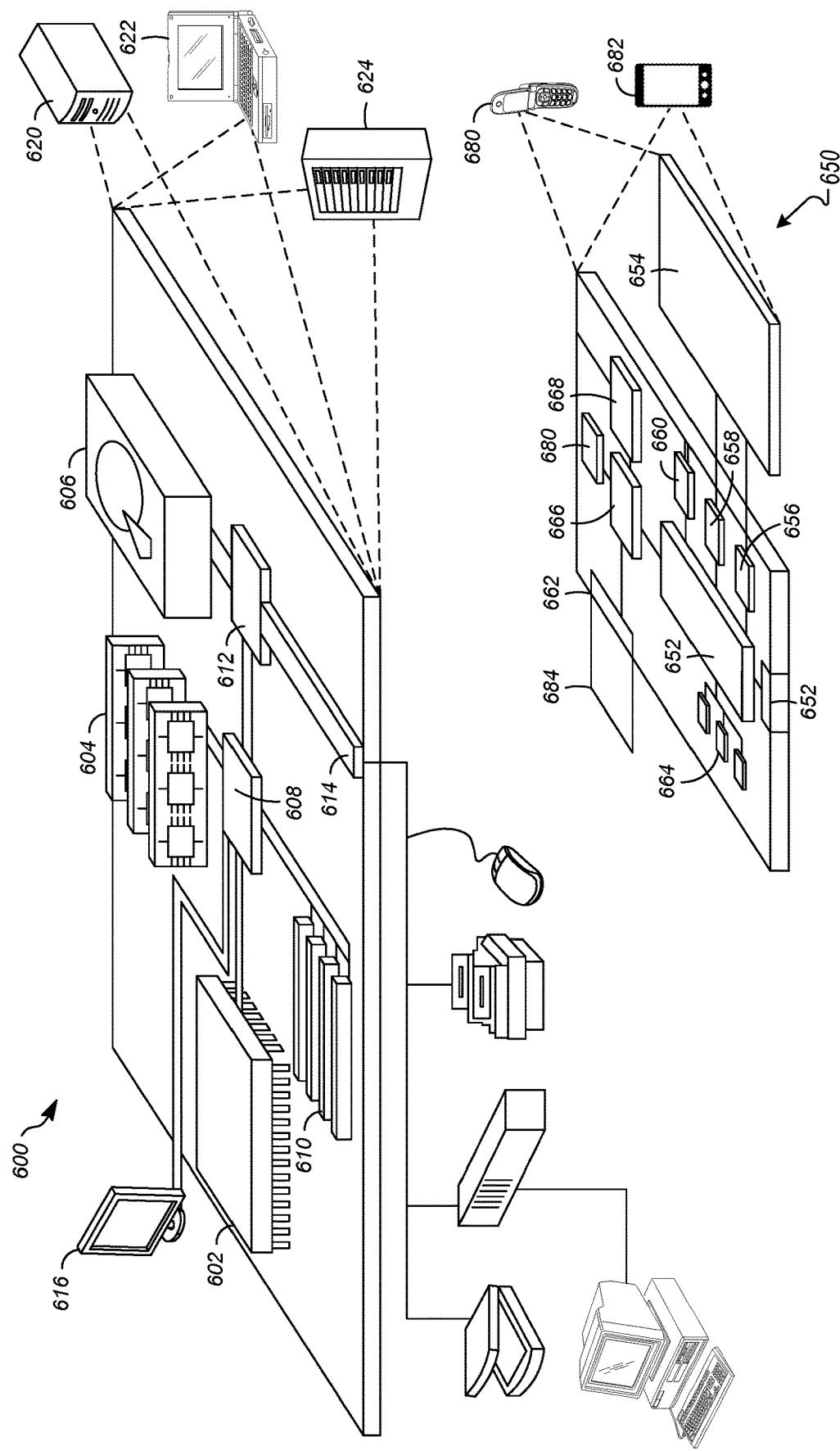
FIG. 6 is a diagram that illustrates an example of a computer device and a mobile computer device that can be used to implement the described techniques.

FIG. 6 illustrates an example of a generic computer device 600 and a generic mobile computer device 650, which may be used with the techniques described here. Computer device 600 is one example configuration of computer 120 of FIG. 1 and FIG. 2.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

In the following some examples are described.

Example 1: A method, comprising:
receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
identifying, based on the image data, a region of the plurality of regions of the display at which a gaze of a user is directed at the instant of time, the identifying including inputting the at least one image of the eye of the user into a classification engine configured to classify the gaze as being directed to one of the plurality of regions; and
activating the element of the user interface to which the identified region corresponds.

Example 2: The method as in example 1, wherein the classification engine includes a first branch representing a convolutional neural network (CNN).

Example 3: The method as in claim 2, wherein the classification engine is configured to produce, as an output, a vector having a number of elements equal to a number of regions of the plurality of regions, each element of the vector including a number corresponding to a respective region of the plurality of regions, the number representing a likelihood of the gaze of the user being directed to the region to which the number corresponds.

Example 4: The method as in example 3, wherein the classification engine includes a softmax layer configured to produce, as an output of the classification engine, as the likelihood corresponding to for each region of the plurality of regions, a probability between zero and unity, and wherein identifying the region further includes selecting, as the identified region, a region of the plurality of regions having a probability greater than the probability of each of the other regions of the plurality of regions.

Example 5: The method as in example 3, wherein identifying the region further includes generating image cluster data representing a set of image clusters corresponding the plurality of regions on the display, and wherein the classification engine includes a loss function based on distances from the set of image clusters.

Example 6: The method as in example 1, further comprising training the classification engine, the training being based on a mapping between images of the eye of the user and a region identifier identifying a region of the plurality of regions at which the gaze of the user is directed.

Example 7: The method as in example 1, wherein the display is a transparent display embedded in smartglasses.

Example 8: The method as in example 7, wherein the classification engine further includes a second branch representing a neural network, and wherein the method further comprises outputting, from the second branch and based on the image data, a pose of the eye of the user with respect to a camera mounted on the smartglasses.

Example 9: The method as in example 8, wherein the classification engine includes an attention layer, and wherein identifying the region further includes causing the attention layer to adjust probabilities of the gaze being directed to the regions of the display based on the outputted pose of the eye.

Example 10: The method as in example 1, wherein the user is a first user, wherein the classification engine further includes a second branch representing a neural network, and wherein the method further comprises inputting into the second branch a parameter value indicating a difference between the first user and a second user; and causing the second branch to adjust probabilities of the gaze being directed to the regions of the display based on the parameter value.

Example 11: The method as in example 1, wherein the user is a first user, wherein the classification engine further includes a second branch representing a neural network, and wherein the method further comprises inputting into the second branch a parameter value indicating a geometrical configuration of the plurality of regions; and causing the second branch to adjust probabilities of the gaze being directed to the regions of the display based on the parameter value.

Example 12: The method as in example 1, wherein the user is a first user, wherein the classification engine further includes a second branch representing a neural network, and wherein the method further comprises inputting into the second branch a parameter value indicating a temporal smoothness of the image data; and causing the second branch to adjust probabilities of the gaze being directed to the regions of the display based on the parameter value Example 13: A computer program product comprising a nontransitory storage medium, the computer program product including code that, when executed by processing circuitry of a computer, causes the processing circuitry to perform a method, the method comprising:
receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
identifying, based on the image data, a region of the plurality of regions of the display at which a gaze of a user is directed at the instant of time, the identifying including inputting the at least one image of the eye of the user into a classification engine configured to classify the gaze as being directed to one of the plurality of region; and
activating the element of the user interface to which the identified region corresponds.

Example 14: The computer program product as in example 13, wherein the classification engine includes a first branch representing a convolutional neural network (CNN).

Example 15: The computer program product as in example 13, wherein the classification engine is configured to produce, as an output, a number corresponding to each of the plurality of regions, the number representing a likelihood of the gaze of the user being directed to the region to which the number corresponds.

Example 16: The computer program product as in example 13, wherein the method further comprises training the classification engine, the training being based on a mapping between images of the eye of the user and a region identifier identifying a region of the plurality of regions at which the gaze of the user is directed.

Example 17: The computer program product as in example 13, wherein the display is a transparent display embedded in smartglasses.

Example 18: The computer program product as in example 17, wherein the classification engine further includes a second branch representing a neural network, and wherein the method further comprises outputting, from the second branch and based on the image data, a position and orientation of the eye of the user with respect to a camera mounted on the smartglasses.

Example 19: The computer program product as in example 18, wherein the classification engine includes an attention layer, and wherein identifying the region further includes causing the attention layer to adjust probabilities of the gaze being directed to the regions of the display based on the outputted position and orientation of the eye.

Example 20: An electronic apparatus, the electronic apparatus comprising:
  memory; and
  processing circuitry coupled to the memory, the processing circuitry being configured to:
  receive image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
  identify, based on the image data, a region of the plurality of regions of the display at which a gaze of a user is directed at the instant of time, the identifying including inputting the at least one image of the eye of the user into a classification engine configured to classify the gaze as being directed to one of the plurality of regions; and
  activate the element of the user interface to which the identified region corresponds.

What is claimed is:

1. A method comprising:
  receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
  identifying, based on the image data, a region of the plurality of regions of the display at which a gaze of a user is directed at the instant of time, the identifying including inputting the at least one image of the eye of the user into a classification engine configured to classify the gaze as being directed to one of the plurality of regions; and
  activating an element of the user interface to which the identified region corresponds.

2. The method as in claim 1, wherein the classification engine includes a first branch representing a convolutional neural network (CNN).

3. The method as in claim 1, wherein the classification engine is configured to produce, as an output, a vector having a number of elements equal to a number of regions of the plurality of regions, each element of the vector including a number corresponding to a respective region of the plurality of regions, the number representing a likelihood of the gaze of the user being directed to the region to which the number corresponds.

4. The method as in claim 3, wherein the classification engine includes a softmax layer configured to produce, as an output of the classification engine, as the likelihood corresponding to each region of the plurality of regions, a probability between zero and unity, and
  wherein identifying the region further includes:
    selecting, as the identified region, a region of the plurality of regions having a probability greater than the probability of each of the other regions of the plurality of regions.

5. The method as in claim 3,
  wherein identifying the region further includes:
    generating image cluster data representing a set of image clusters corresponding the plurality of regions on the display, and
  wherein the classification engine includes a loss function based on distances from the set of image clusters.

6. The method as in claim 1, further comprising:
  training the classification engine, the training being based on a mapping between images of the eye of the user and a region identifier identifying a region of the plurality of regions at which the gaze of the user is directed.

7. The method as in claim 1, wherein the display is a transparent display embedded in smartglasses.

8. The method as in claim 7, wherein the classification engine further includes a second branch representing a neural network, and
  wherein the method further comprises:
    outputting, from the second branch and based on the image data, a pose of the eye of the user with respect to a camera mounted on the smartglasses.

9. The method as in claim 8, wherein the classification engine includes an attention layer, and
  wherein identifying the region further includes:
    causing the attention layer to adjust probabilities of the gaze being directed to the regions of the display based on the outputted pose of the eye.

10. The method as in claim 1, wherein the user is a first user,
  wherein the classification engine further includes a second branch representing a neural network, and
  wherein the method further comprises:
    inputting into the second branch a parameter value indicating a difference between the first user and a second user; and
    causing the second branch to adjust probabilities of the gaze being directed to the regions of the display based on the parameter value.

11. The method as in claim 1, wherein the user is a first user,
  wherein the classification engine further includes a second branch representing a neural network, and
  wherein the method further comprises:
    inputting into the second branch a parameter value indicating a geometrical configuration of the plurality of regions; and
    causing the second branch to adjust probabilities of the gaze being directed to the regions of the display based on the parameter value.

12. The method as in claim 1, wherein the user is a first user,
wherein the classification engine further includes a second branch representing a neural network, and
wherein the method further comprises:
inputting into the second branch a parameter value indicating a temporal smoothness of the image data; and
causing the second branch to adjust probabilities of the gaze being directed to the regions of the display based on the parameter value.

13. A computer program product comprising a nontransitory storage medium, the computer program product including instructions that, when executed by processing circuitry, causes the processing circuitry to perform a method, the method comprising:
receiving image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
identifying, based on the image data, a region of the plurality of regions of the display at which a gaze of a user is directed at the instant of time, the identifying including inputting the at least one image of the eye of the user into a classification engine configured to classify the gaze as being directed to one of the plurality of regions; and
activating an element of the user interface to which the identified region corresponds.

14. The computer program product as in claim 13, wherein the classification engine includes a first branch representing a convolutional neural network (CNN).

15. The computer program product as in claim 13, wherein the classification engine is configured to produce, as an output, a number corresponding to each of the plurality of regions, the number representing a likelihood of the gaze of the user being directed to the region to which the number corresponds.

16. The computer program product as in claim 13, wherein the method further comprises:
training the classification engine, the training being based on a mapping between images of the eye of the user and a region identifier identifying a region of the plurality of regions at which the gaze of the user is directed.

17. The computer program product as in claim 13, wherein the display is a transparent display embedded in smartglasses.

18. The computer program product as in claim 17, wherein the classification engine further includes a second branch representing a neural network, and
wherein the method further comprises:
outputting, from the second branch and based on the image data, a pose of the eye of the user with respect to a camera mounted on the smartglasses.

19. The computer program product as in claim 18, wherein the classification engine includes an attention layer, and
wherein identifying the region further includes:
causing the attention layer to adjust probabilities of the gaze being directed to the regions of the display based on the outputted pose of the eye.

20. An electronic apparatus, the electronic apparatus comprising:
memory; and
controlling circuitry coupled to the memory, the controlling circuitry being configured to:
receive image data representing at least one image of an eye of a user looking at a display at an instant of time, the display including a plurality of regions and being configured to operate in an augmented reality (AR) application, each of the plurality of regions including a plurality of pixels and corresponding to a respective element of a user interface;
identify, based on the image data, a region of the plurality of regions of the display at which a gaze of a user is directed at the instant of time, the identifying including inputting the at least one image of the eye of the user into a classification engine configured to classify the gaze as being directed to one of the plurality of regions; and
activate an element of the user interface to which the identified region corresponds.

21. The electronic apparatus as in claim 20, wherein the classification engine includes a first branch representing a convolutional neural network (CNN).

* * * * *